(12) United States Patent
Kikuchi

(10) Patent No.: US 7,180,688 B2
(45) Date of Patent: Feb. 20, 2007

(54) HOLDER/OPTICAL-ELEMENT ASSEMBLY

(75) Inventor: Kimihiro Kikuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/794,150

(22) Filed: Mar. 5, 2004

(65) Prior Publication Data

US 2004/0174618 A1 Sep. 9, 2004

(30) Foreign Application Priority Data

Mar. 7, 2003 (JP) ............... 2003-060947

(51) Int. Cl.
*G02B 7/02* (2006.01)
(52) U.S. Cl. .............. 359/808; 359/819; 359/811
(58) Field of Classification Search ........ 359/811, 359/808, 815, 819, 827, 829; 351/177–78; 425/808
See application file for complete search history.

(56) References Cited

U.S. PATENT DOCUMENTS

| 5,280,389 | A | * | 1/1994 | Kunikane et al. ........... 359/664 |
|---|---|---|---|---|
| 5,588,980 | A | * | 12/1996 | Ito ............................. 65/223 |
| 5,603,125 | A | * | 2/1997 | Chou ........................... 2/428 |
| 6,224,467 | B1 | * | 5/2001 | Tanaka et al. ................ 451/42 |
| 6,567,224 | B2 | * | 5/2003 | Hatakeyama et al. ....... 359/819 |
| 2002/0097511 | A1 | * | 7/2002 | Kanematsu et al. ......... 359/811 |

FOREIGN PATENT DOCUMENTS

| EP | 0 539 795 A1 | 5/1993 |
|---|---|---|
| EP | 1 162 481 A2 | 12/2001 |
| EP | 1 329 756 A1 | 7/2003 |
| JP | 02069327 | 3/1990 |
| JP | 03167514 | 7/1991 |
| JP | 05066302 | 3/1993 |
| JP | 07043575 | 2/1995 |
| JP | 2729702 | 12/1997 |

OTHER PUBLICATIONS

Translation of JP 05-066302 Tanabe Takashi, Fresnel Lens Structure, Mar. 19, 1993.*
Search Report dated Aug. 2, 2004 for European Patent Application No. EP 04 25 0906.

* cited by examiner

*Primary Examiner*—Jordan Schwartz
*Assistant Examiner*—Jessica Stultz
(74) *Attorney, Agent, or Firm*—Brinks Hofer Gilson & Lione

(57) ABSTRACT

A holder/optical-element assembly includes a holder and an optical element disposed within the holder. The holder has an inner periphery surface in which at least one opening is provided, and the optical element is formed with at least one protrusion extending outward from an outer periphery of the optical element. The protrusion of the optical element is engaged with the opening of the holder.

22 Claims, 4 Drawing Sheets

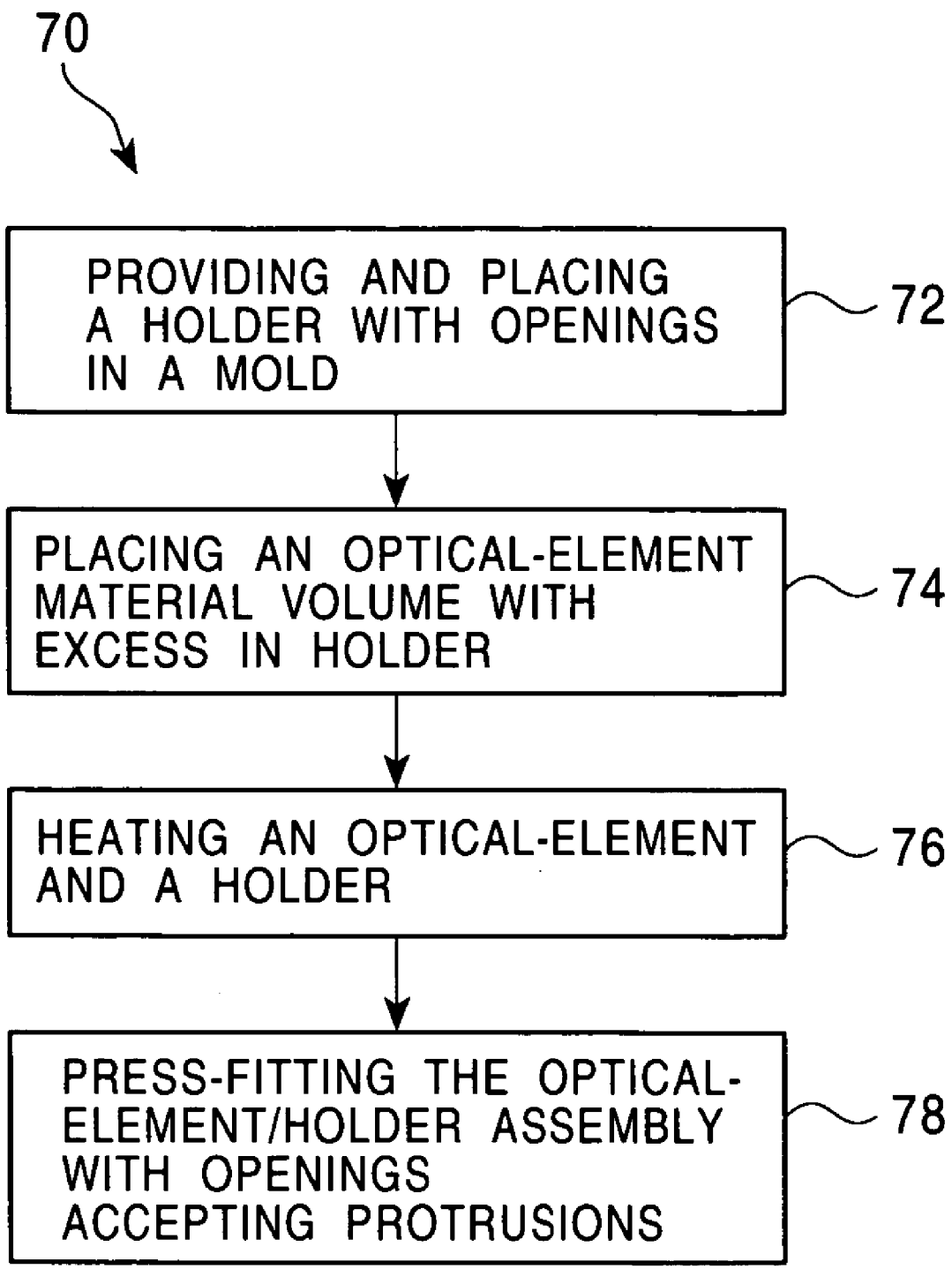

US 7,180,688 B2

HOLDER/OPTICAL-ELEMENT ASSEMBLY

This application claims the benefit of priority under 35 U.S.C. 119 (a)–(d) to Japanese Patent Application 2003-060947, which was filed on Mar. 7, 2003.

BACKGROUND OF THE INVENTION

1. Field of the Invention

The present invention relates to holder/optical-element assemblies in which an optical element is integrated with a holder, and particularly, to a holder/optical-element assembly formed by press-molding an optical-element material.

2. Description of the Related Art

Optical elements, such as lenses used in digital cameras and in pickup heads of CD players, require high precision when installed. As disclosed in, for example, Japanese Patent No. 2729702, a substantially—precise installation is generally achieved by forming a holder/optical-element assembly, in which the optical element is held by the holder, and then adjusting a position of the holder during the installation. In this holder/optical-element assembly, the optical element is formed by setting an optical-element material within a cylindrical holder, heating the material until it softens, and then press-molding the softened material using a mold. In the above-described method, the optical element is formed and press-fitted to the holder in order to achieve an integration of the optical element with the holder.

When press-molding, if the optical-element material has a volume error, a thickness of the optical element may vary. This may not only deteriorate an optical quality of the optical element, but also may require adjustment and fixing to an appropriate optical position, thus causing potential problems in terms of optical performance and positioning.

To minimize these problems, a method is provided for reducing volume errors by improving a volume precision of the optical-element material. To increase the effect of this method, however, improvement is sought in the precision of not only the volume of the optical-element material but also a formation of the holder.

SUMMARY OF THE INVENTION

Accordingly, an embodiment of the present invention provides a substantially precise holder/optical-element assembly that is capable of compensating for volume errors of an optical-element material.

In another aspect of the present invention, to minimize the problems mentioned above, a holder/optical-element assembly is provided which includes a cylindrical holder and an optical element disposed within the holder. The holder has an inner periphery surface in which at least one opening is provided, and the optical element is provided with at least one protrusion extending outward from a periphery of the optical element. As such, the at least one protrusion of the optical element may be supported by the at least one opening of the holder.

The at least one protrusion of the optical element may comprise an additional volume of material for the optical element.

The holder may be provided with at least one engagement groove along the inner periphery surface of the holder. In this case, the at least one engagement groove may define the at least one opening.

The holder may be provided with a plurality of micro-pores over the inner periphery surface of the holder. In this case, the plurality of micro-pores defines a plurality of openings.

The holder may be provided with the plurality of micro-pores over a portion of the inner periphery surface of the holder. In this case, the plurality of micro-pores defines the plurality of openings.

Accordingly, the plurality of openings may support the volume error of the optical-element material during the press-molding of the optical element to achieve a substantial precision in the formation of the optical-element, thereby providing a holder/optical element assembly having a substantially precise optical element without requiring further improvement to the precision of the holder.

BRIEF DESCRIPTION OF THE DRAWINGS

FIG. 7 is a flow diagram illustrating the method of producing a holder/optical-element assembly.

DESCRIPTION OF THE PREFERRED EMBODIMENTS

Figure 1:
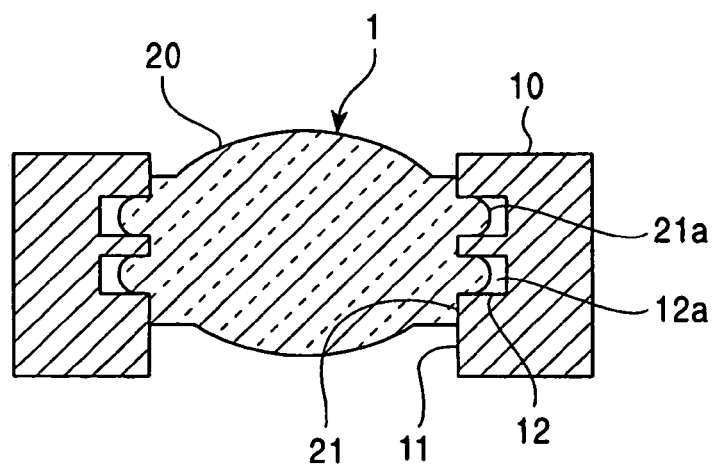
FIG. 1 is a cross-sectional view of a holder/optical-element assembly according to a first embodiment of the present invention.
Figure 2A:
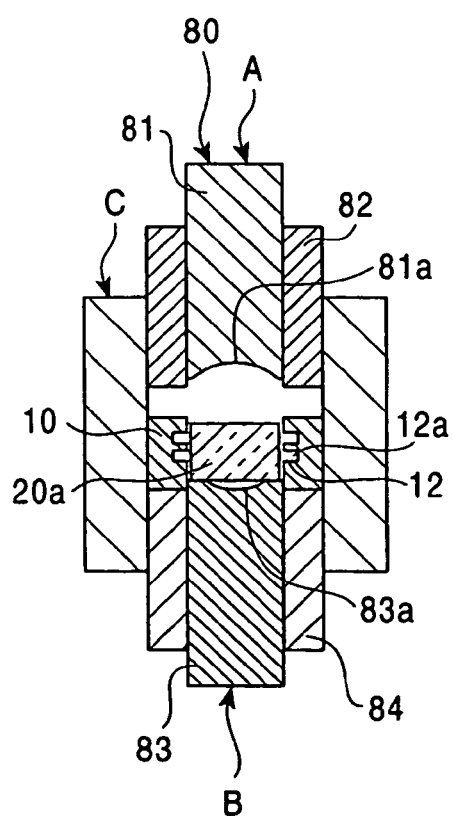
FIGS. 2A and 2B are cross-sectional views illustrating two manufacturing steps during an assembly of the first embodiment of FIG. 1.
Figure 2B:
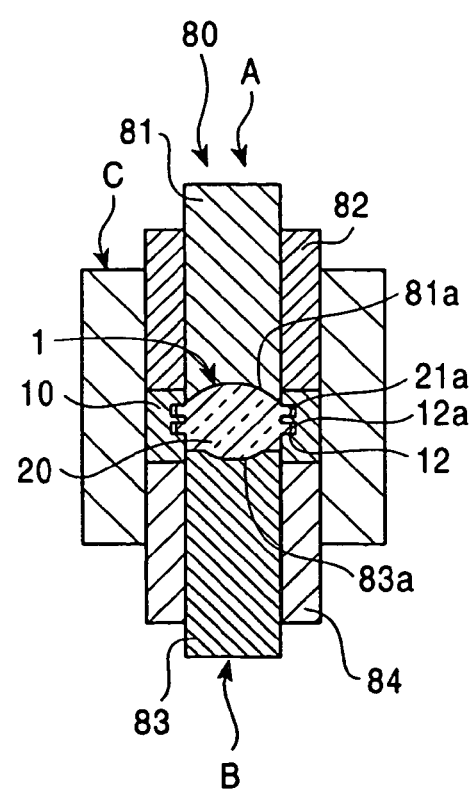

Embodiments of the present invention will be described below with reference to the drawings. A first embodiment will now be described. FIG. 1 is a cross-sectional view of a holder/optical-element assembly 1 according to the first embodiment of the present invention. FIGS. 2A and 2B are cross-sectional views illustrating two manufacturing steps during an assembly of the first embodiment of FIG. 1.

The assembly 1 may be used in, for example, a digital camera or a pickup head of a CD player. Referring to FIG. 1, the assembly 1 includes a cylindrical lens holder 10 and a spherical lens 20 that is disposed within the lens holder 10.

The lens holder 10 holds the lens 20 and provides the positioning of the lens 20 in an optical apparatus. The lens holder 10 is formed by, for example, cutting or casting a material such as aluminum and stainless steel. The lens holder 10 is provided with openings 12, namely engagement grooves 12a, along the inner periphery surface 11 of the lens holder 10.

The lens 20, which may be formed of glass, is disposed within the lens holder 10. The lens 20 may be a biconvex spherical lens and, as shown in FIG. 2A, may be formed by press-molding a lens material 20a. During the press-molding, an applied pressure causes the lens material 20a to be press-fitted to the lens holder 10, whereby the lens 20 is integrated with the lens holder 10. Extending outward partially from the periphery 21 of the lens 20 are protrusions 21a, which engage with the openings 12.

The lens material 20a may comprise an optical glass material, such as SFS01 which is a lead-oxide glass material.

With respect to a required volume of the lens material 20*a* for forming the lens 20, the material 20*a* is deliberately provided with an additional volume. This additional volume may compensate for a volume error existing in the lens material 20*a*, and therefore, the required volume of the lens material 20*a* for forming the lens 20 may be ensured.

The pressure applied during the press-molding of the lens 20 may cause the additional volume of the lens material 20*a* to flow into the openings 12, namely the engagement grooves 12*a*, thereby forming the protrusions 21*a*. In other words, the additional volume of the lens material 20*a*, which is a volume not originally required for forming the lens 20, is engaged with the openings 12. This means that the volume error inherently included in the additional volume is also engaged with the openings 12, thereby achieving the formation of a substantially precise lens 20 with a desired shape.

When the lens material 20*a* flows into the openings 12, the openings 12 may apply a flow resistance to the lens material 20*a*. If the widths of the engagement grooves 12*a* forming the openings 12 are large, the flow resistance of the openings 12 may be low. On the other hand, if the widths are small, the flow resistance may be high. Although only two engagement grooves 12*a* are provided in FIG. 1, the number and the width of the grooves 12*a* may be modified depending on, for example, a viscosity of the lens material 20*a*. In other words, by coordinating the number and the width of the grooves 12*a*, the flow resistance of the openings 12 may be adjusted with respect to the lens material 20*a*. Here, the volume of the openings 12 may need to be larger than the additional volume of the lens material 20*a*.

A high flow resistance may excessively interfere with the flow of the lens material 20*a* into the openings 12 and may cause the additional volume itself to cause a formation error of the lens 20. On the other hand, a low flow resistance may cause the lens material 20*a* to flow into the openings 12 too easily when the molding pressure is applied, thus causing the lens material 20*a* to fill the openings 12. As described above, because the spatial volume of the openings 12 is made larger than the additional volume of the lens material 20*a*, if the openings 12 are filled with the lens material 20*a*, the original required volume of the lens material 20*a* for forming the lens 20 may also leak into the openings 12. This would result in an undesirable formation error of the lens 20. In other words, the flow resistance of the openings 12 may need to be adjusted to an extent that the whole additional volume of the lens material 20*a* may flow into the openings 12 by the molding pressure while the original desired lens volume is prevented from entering the openings 12.

As described previously, the flow resistance of the openings 12 may need to be adjusted with respect to the viscosity of the lens material 20*a* or different molding pressures. In other words, if the viscosity of the lens material 20*a* is near a glass transition-point and a fluidity of the lens material 20*a* is low, the flow resistance of the openings 12 may need to be set lower. On the other hand, if the viscosity is near a softening point and the fluidity is high, the flow resistance of the openings 12 may need to be set higher.

Similarly, the flow resistance of the openings 12 may be adjusted such that if the molding pressure is low, the resistance may be made smaller, and vice versa. Based on these conditions, by selecting an appropriate shape for the openings 12 with a flow resistance that brings out a desired functionality, a flexible adjustment can be made with respect to, for example, a material change of the lens material 20*a*. Alternatively, the molding pressure or the viscosity of the lens material 20*a* may be adjusted if possible.

A method for manufacturing the holder/optical-element assembly 1 will now be described. FIGS. 2A and 2B each illustrate a manufacturing device 80 for the assembly 1. The manufacturing device 80 includes an upper mold A provided with an inner upper-mold component 81 and an outer upper-mold component 82. Below these components 81 and 82 are an inner lower-mold component 83 and an outer lower-mold component 84, respectively, which form a lower mold B. Furthermore, the upper and lower molds A and B are enclosed by an enclosing mold C.

The inner upper-mold component 81 and the inner lower-mold component 83 substantially have a column-like structure. The lower end of the component 81 and the upper end of the component 83, respectively, are provided with transferring surfaces 81*a* and 83*a* for molding surfaces of the spherical lens.

On the other hand, the outer upper-mold component 82 and the outer lower-mold component 84 are tubular and enclose the respective components 81 and 83. A wall thickness of the components 82 and 84 is substantially equivalent to that of the lens holder 10, and an inner circumference of the enclosing mold C is substantially equivalent to an outer circumference of the lens holder 10. Furthermore, the components 81 and 82 are slidable independently in a vertical direction.

Referring to FIG. 2A, for forming the assembly 1, the lens holder 10, which is pre-formed to predetermined dimensions by, for example, cutting, is first placed on the component 84, and the lens material 20*a* is then disposed within the lens holder 10.

Although not shown in FIGS. 2A and 2B, a heater facing the periphery of the lens holder 10 is provided for heating the holder 10 so as to heat the lens material 20*a* to a temperature exceeding its softening point. Alternately, the lens material 20*a* may be pre-heated before being disposed in the lens holder 10.

Referring to FIG. 2B, once the heated lens material 20*a* has softened, the material 20*a* is press-molded. Furthermore, the outer upper-mold component 82 is lowered to the lens holder 10 disposed on the outer lower-mold component 84 so that the lens holder 10 is secured between the component 82 and the component 84. The inner upper-mold component 81 is then lowered to the softened lens material 20*a* disposed on the inner lower-mold component 83 so that transferring surfaces 81*a* and 83*a* of the respective components 81 and 83 apply pressure against the lens material 20*a*. Consequently, the lens 20, a biconvex spherical lens, is formed. This press-molding process is performed within a range where the viscosity of the lens material 20*a* is between the glass transition-point and the softening point.

When pressure is applied to the lens material 20*a*, the molding pressure forces the additional volume of the material 20*a* to flow into the grooves 12*a* provided along the inner periphery surface 11 of the lens holder 10, thereby forming the protrusions 21*a*.

Figure 3:
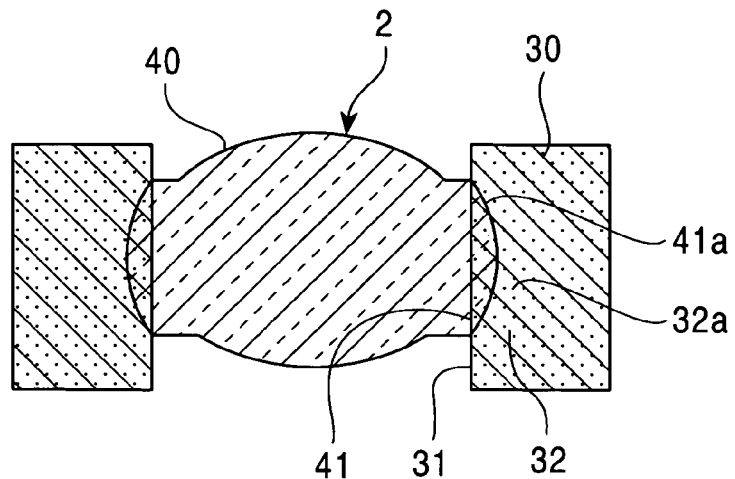
FIG. 3 is a cross-sectional view of a holder/optical-element assembly according to a second embodiment of the present invention.
Figure 4A:
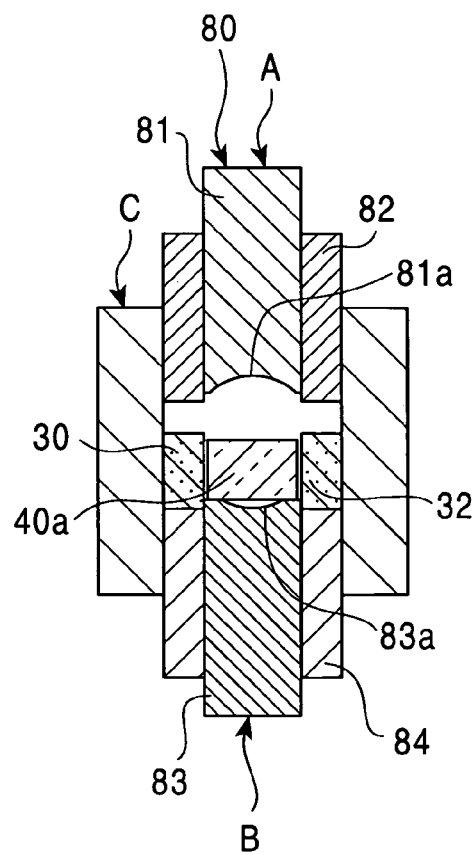
FIGS. 4A and 4B are cross-sectional views illustrating two manufacturing steps during an assembly of the second embodiment of FIG. 3.
Figure 4B:
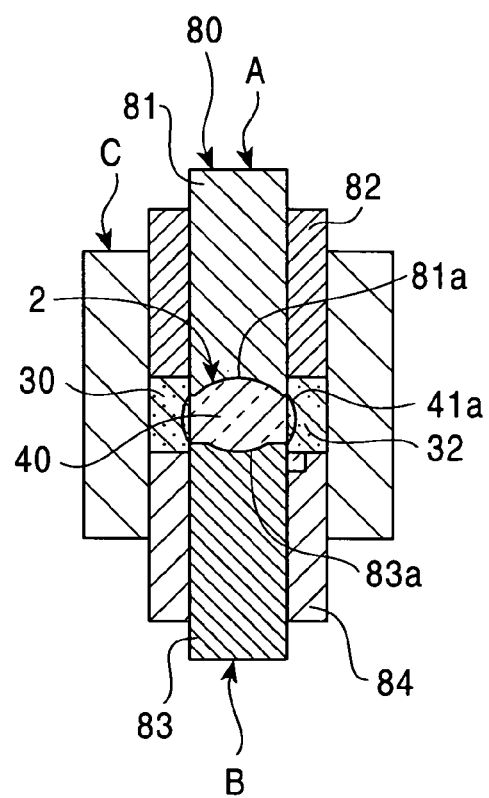

A second embodiment of the present invention will now be described. FIG. 3 is a cross-sectional view of a holder/optical-element assembly 2 according to the second embodiment. FIGS. 4A and 4B are cross-sectional views of the assembly 2 in its manufacturing process.

The assembly 2 is used in, for example, a digital camera or a pickup head of a CD player, like the assembly 1 of the first embodiment. Referring to FIG. 3, the assembly 2 includes a cylindrical lens holder 30, and a spherical lens 40 that is disposed within the lens holder 30.

The lens holder 30 comprises one of, for example, aluminum and stainless steel and is provided with openings 32, namely, pores 32a, throughout the structure of the lens holder 30. Furthermore, the lens holder 30 with its openings 32, i.e. pores 32a, is formed by one of, for example, powder-sintering and porous-metal forming.

The lens 40, which comprises glass material, is disposed within the lens holder 30. The lens 40 is a biconvex spherical lens and, as shown in FIGS. 4A and 4B, is formed by press-molding a lens material 40a. During press-molding, the applied pressure causes the lens material 40a to be press-fitted to the lens holder 30, whereby the lens 40 is integrated with the lens holder 30. Extending outward substantially from the entire surface of the periphery 41 of the lens 40 are protrusions 41a; which engage with the openings 32.

With respect to the required volume of the lens material 40a for forming the lens 40, the material 40a is deliberately provided with an additional volume, as in the first embodiment. The pressure applied during the press-molding of the lens 40 causes the additional volume of the lens material 40a to flow into the openings 32, namely, the pores 32a, thereby forming the protrusions 41a. Accordingly, the additional volume of the lens material 40a, which is a volume not originally required for forming the lens 40, is engaged with the openings 32 along with the volume error to achieve the formation of a substantially precise lens 40 having a desired shape.

When the lens material 40a flows into the openings 32, the openings 32 may apply a flow resistance against the lens material 40a, as in the first embodiment. If the diameters of the pores 32a are large, the flow resistance may be low, whereas if the diameters are small, the flow resistance may be high. The flow resistance of the openings 32 may need to be adjusted to an extent that the whole additional volume of the lens material of the lens material 40a may flow into the openings 32 by the molding pressure while the original required volume may be prevented from entering the openings 32. As in the first embodiment, the adjustment of the flow resistance of the openings 32 may be made with respect to the viscosity of the lens material 40a or different molding pressures. Here, the spatial volume of the openings 32 may be larger than the additional volume of the lens material 40a.

The flow resistance of the openings 32 against the lens material 40a may be adjusted by changing a porosity of the holder, that is, the ratio of the pores 32a to the overall volume of the lens holder 30. The porosity is preferably in a range from 30% to 60% by powder-sintering, and 50% to 95% by porous-metal forming. The pores 32a may have a size ranging from a few microns to 100 μm and should be continuous.

A method for manufacturing the holder/optical-element assembly 2 will now be described. Referring to each of FIGS. 4A and 4B, the manufacturing device 80 for the assembly 2 is the same as that of the first embodiment, and the description of the structure will therefore be omitted. Referring to FIG. 4A, for forming the assembly 2, the lens holder 30 which is pre-formed to predetermined dimensions by, for example, powder-sintering or porous-metal forming is first placed on the outer lower-mold component 84, and the lens material 40a is then disposed within the lens holder 30. Referring to FIG. 4B, after the lens holder 30 and the lens material 40a are heated to soften the material 40a, the material 40a is press-molded.

The molding pressure applied to the lens material 40a forces the additional volume of the material 40a to flow into the openings 32 beyond the inner periphery surface 31 of the lens holder 30, thereby forming the protrusions 41a.

Figure 5:
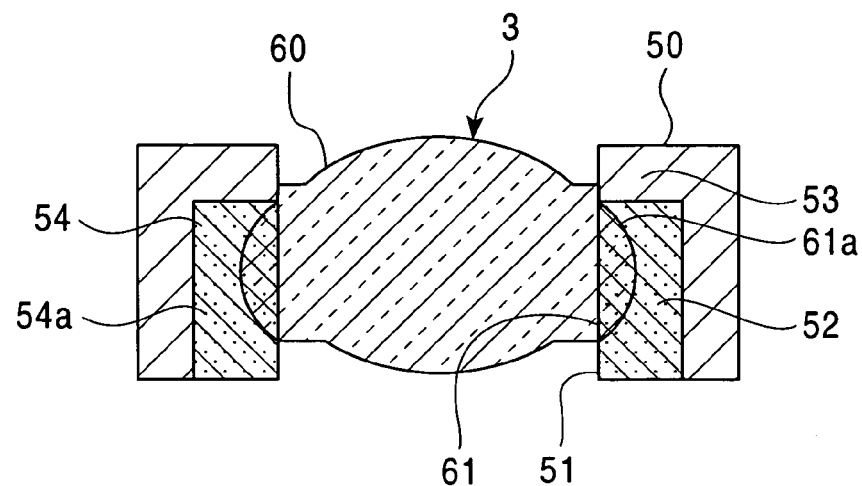
FIG. 5 is a cross-sectional view of a holder/optical-element assembly according to a third embodiment of the present invention.
Figure 6A:
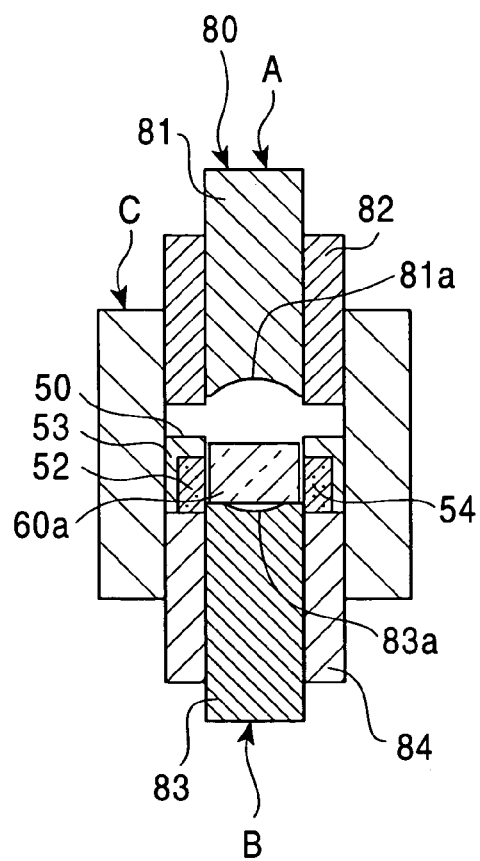
FIGS. 6A and 6B are cross-sectional views illustrating two manufacturing steps during an assembly of the third embodiment of FIG. 5.
Figure 6B:
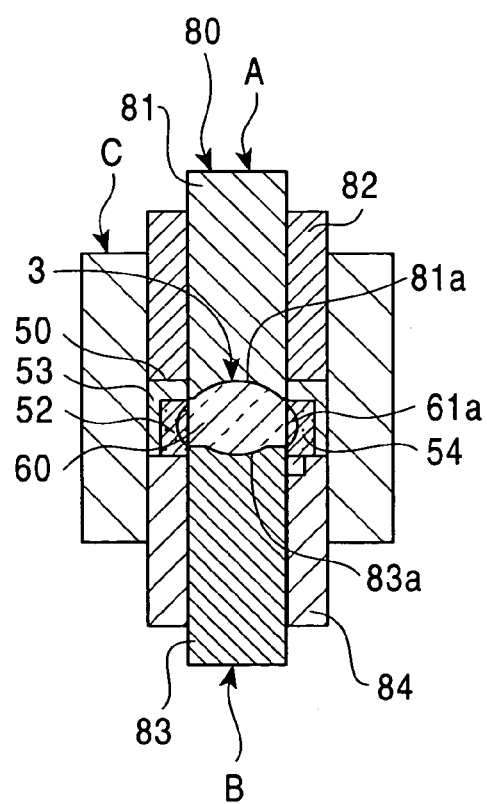

A third embodiment of the present invention will now be described. FIG. 5 is a cross-sectional view of a holder/optical-element assembly 3 according to the third embodiment. FIGS. 6A and 6B are cross-sectional views of the assembly 3 in its manufacturing process.

The assembly 3 is used in, for example, a digital camera or a pickup head of a CD player, like the assemblies 1 and 2 of the first and second embodiments. Referring to FIG. 5, the assembly 3 includes a cylindrical lens holder 50, and a spherical lens 60 that is disposed within the lens holder 50.

According to the third embodiment, a lens holder 50 includes an inner holder part 52 and an outer holder part 53. The inner holder part 52 is cylindrical and is disposed within an interior side of the lens holder 50. The part 52 may occupy a portion of the inner periphery surface 51 of the lens holder 50. The inner holder part 52 comprises one of, for example, aluminum and stainless steel and is provided with openings 54, namely, pores 54a, throughout an entire structure of the part 52. Furthermore, the part 52 with its openings 54, i.e. pores 54a, is formed by, for example, powder-sintering or porous-metal forming. The requirements for the openings 54 may be similar to those of the second embodiment.

The outer holder part 53 may be formed by, for example, cutting or casting a material such as aluminum and stainless steel. The part 53 encloses an outer periphery of the part 52 and at least one of the surfaces of the part 52 that contacts the part 53. The part 53 may ensure airtight installation of the assembly 3 in an optical apparatus. This ensured airtightness of the assembly 3 may prevent, for example, internal corrosion of an optical apparatus caused by moisture or the like. The part 52 may be fixed to the part 53 by, for example, press-fitting or welding for the integration of the two parts 52 and 53.

The lens 60, which is formed of glass, is disposed within the lens holder 50. The lens 60 is a biconvex spherical lens and, as shown in FIG. 6A, is formed by press-molding a lens material 60a. During press-molding, the applied pressure may cause the lens material 60a to be press-fitted to the lens holder 50, whereby the lens 60 is integrated with the lens holder 50. Extending outward partially from a periphery 61 of the lens 60 are protrusions 61a, which engage with the openings 54.

With respect to the required volume of the lens material 60a for forming the lens 60, the material 60a is deliberately provided with an additional volume, as in the first and second embodiments. The pressure applied during the press-molding of the lens 60 may cause the additional volume of the lens material 60a to flow into the openings 54, namely, the pores 54a, thereby forming the protrusions 61a. Accordingly, the additional volume of the lens material 60a, which is a volume not originally required for forming the lens 60, is engaged with the openings 54 along with the volume error to achieve the formation of a substantially precise lens 60 with a desired shape.

A method for manufacturing the holder/optical-element assembly 3 will now be described. Referring to each of FIGS. 6A and 6B, the manufacturing device 80 for the assembly 3 is the same as those of the first and second embodiments, and the description of the structure will therefore be omitted. Referring to FIG. 7, for forming the assembly 3, the lens holder 50, which is pre-formed to predetermined dimensions and includes the parts 52 and 53, is first placed on the outer lower-mold component 84, at step 72. The lens material 60a is then disposed within the lens holder 50, at step 74. After the lens holder 50 and the lens material 60a are heated, at step 76, to soften the material 60a, the material 60a is press-molded at step 78.

The molding pressure applied to the lens material 60a may force the additional volume of the material 60a to flow into the openings 54 of the inner holder part 52 of the lens holder 50, thereby forming the protrusions 61a.

Although a spherical convex-lens is being described as an example for the above embodiments, the present invention is not limited to this lens type. Alternatively, the present invention may also be applied to a lens with a different shape, such as a concave lens. Furthermore, the present invention is not limited to lenses and may apply to other optical elements, such as a diffraction grating integrated with a holder.

What is claimed is:

1. An assembly comprising an optical element disposed within a holder,
    wherein the holder has an inner periphery surface having a plurality of micro-pores that have a size ranging from a few microns to approximately 100 μm and are continuous, and the optical element has a plurality of protrusions extending outward from a periphery of the optical element, at least one of the plurality of protrusions being engaged with at least one of the plurality of micro-pores but not filling the plurality of micro-pores.

2. The assembly according to claim 1, wherein the protrusion of the optical element comprises an additional volume of optical element material.

3. The assembly according to claim 1, wherein the holder comprises a plurality of micro-pores disposed over a portion of the inner periphery surface of the holder, the micro-pores defining a plurality of openings.

4. The assembly according to claim 1, wherein the optical element comprises a spherical lens.

5. The assembly according to claim 4, wherein the lens comprises glass material.

6. The assembly according to claim 1, wherein the holder is provided with predetermined dimensions.

7. The assembly according to claim 1, wherein the holder comprises one of aluminum and stainless steel.

8. The assembly according to claim 3, wherein the holder and the plurality of micro-pores are formed by one of powder-sintering and porous metal forming.

9. The assembly according to claim 8 wherein the plurality of micro-pores are formed by powder-sintering, and a porosity of the holder defined by a ratio of a volume of the plurality of pores to a volume of the holder ranges from about 30% to about 60%.

10. The assembly according to claim 8, wherein the plurality of micro-pores are formed by porous-metal forming, and a porosity of the holder defined by a ratio of a volume of the plurality of pores to a volume of the holder ranges from about 50% to about 90%.

11. The assembly according to claim 9, wherein a flow resistance of the plurality of micro-pores is adjusted by the porosity of the holder to allow the additional volume of the lens material to flow into the plurality of the micro-pores.

12. A method for manufacturing an assembly, the method comprises:
    providing a holder having a plurality of micro-pores, which have a size ranging from a few microns to 100 μm and are continuous along an inner periphery surface;
    placing a volume of an optical-element material within the holder, the volume exceeding a minimum volume required for forming the optical element; and
    pressing the optical-element material to integrate the optical element with the holder,
    wherein an excess volume from the pressed optical-element material creates at least one protrusion, the at least one protrusion being engaged with at least one of the plurality of micro-pores but not filling the plurality of micro-pores.

13. The method according to claim 12 further comprising softening the optical-element material prior to pressing.

14. The method according to claim 13 wherein the step of pressing further comprises press-fitting.

15. The method according to claim 12 further comprising heating the holder and the optical-element material to soften the optical-element material prior to pressing.

16. The method according to claim 12 wherein the step of providing a holder comprises providing a holder with a plurality of grooves, which define the micro-pores that are continuous along an inner periphery surface.

17. The method according to claim 12 wherein the excess volume is engaged with the plurality of micro-pores.

18. The method according to claim 12 wherein the step of providing a holder with a plurality of micro-pores comprises providing a holder with a plurality of micro-pores formed by powder-sintering.

19. The method according to claim 12 wherein the step of providing a holder with a plurality of micro-pores comprises providing a holder with a plurality of micro-pores formed by porous metal forming.

20. An assembly comprising an optical element disposed within a holder,
    wherein the holder comprises a plurality of micro-pores, which have a size ranging from a few microns to 100 μm and are continuous along an inner periphery surface, disposed over an inner periphery surface of the holder, and a protrusion of the optical element engages at least one of the plurality of micro-pores.

21. The assembly according to claim 20, wherein the micro-pores are disposed over a portion of the inner periphery surface of the holder.

22. A method for manufacturing an assembly, the method comprising:
    providing a holder having a plurality of micro-pores, which have a size ranging from a few microns to 100 μm and are continuous along an inner periphery surface;
    placing a volume of an optical-element material within the holder, the volume being in excess of a volume required for forming the optical element; and
    pressing the optical-element material to integrate the optical element with the holder.

* * * * *

UNITED STATES PATENT AND TRADEMARK OFFICE
CERTIFICATE OF CORRECTION

PATENT NO.        : 7,180,688 B2  
APPLICATION NO.   : 10/794150  
DATED             : February 20, 2007  
INVENTOR(S)       : Kimihiro Kikuchi It is certified that error appears in the above-identified patent and that said Letters Patent is hereby corrected as shown below:

Column 7, in claim 12, line 2, delete "comprises:" and substitute --comprising:-- in its place.

Signed and Sealed this

Twenty-fourth Day of April, 2007

JON W. DUDAS  
*Director of the United States Patent and Trademark Office*